(12) United States Patent
Murayama et al.

(10) Patent No.: US 9,619,693 B2
(45) Date of Patent: Apr. 11, 2017

(54) DISPLAY SYSTEM, DISPLAY DEVICE, PROJECTION DEVICE AND PROGRAM

(71) Applicant: CASIO COMPUTER CO., LTD., Tokyo (JP)

(72) Inventors: Taiga Murayama, Tokyo (JP); Taichi Honjo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 116 days.

(21) Appl. No.: 14/533,397

(22) Filed: Nov. 5, 2014

(65) Prior Publication Data

US 2015/0154448 A1 Jun. 4, 2015

(30) Foreign Application Priority Data

Nov. 29, 2013 (JP) .................................. 2013-246978

(51) Int. Cl.
*G06K 9/36* (2006.01)
*G06K 9/00* (2006.01)
*G06T 3/40* (2006.01)
*G06T 3/60* (2006.01)

(52) U.S. Cl.
CPC ............ *G06K 9/00221* (2013.01); *G06T 3/40* (2013.01); *G06T 3/60* (2013.01); *G06K 2009/00322* (2013.01)

(58) Field of Classification Search
CPC ...... G06K 2009/00322; G06K 9/00221; G06T 3/40; G06T 3/60
See application file for complete search history.

(56) References Cited

U.S. PATENT DOCUMENTS

| 8,265,410 B1* | 9/2012 | Konoplev | G06K 9/00228 382/118 |
| 2006/0018522 A1* | 1/2006 | Sunzeri | G06F 17/30247 382/118 |
| 2006/0170709 A1* | 8/2006 | Tseng | G06K 9/00221 345/649 |
| 2010/0259647 A1* | 10/2010 | Gann | G06T 11/60 348/239 |
| 2016/0070340 A1* | 3/2016 | Hu | G06F 3/011 345/156 |
| 2016/0241809 A1* | 8/2016 | Sagou | H04W 4/008 |

(Continued)

FOREIGN PATENT DOCUMENTS

| JP | 2011-150221 A | 8/2011 |
| JP | 2013-218393 A | 10/2013 |

*Primary Examiner* — Gandhi Thirugnanam
(74) *Attorney, Agent, or Firm* — Chen Yoshimura LLP (57) ABSTRACT

In an imaging device in a display system, a control unit recognizes human traits from an image of a human being that is an object to be displayed, which is obtained by photography. The image of the human being is correlated to information indicating the recognized traits and then transmitted to a digital signage device by a communication unit. In the digital signage device, the display area on an image display unit is determined in accordance with this information indicating the human traits that have been correlated to the image of the human being that is the object to be displayed, and the image of the human being that is the object to be displayed is modified so to be displayed in the determined display area, after which the modified image is displayed on the determined display area of the image display unit.

14 Claims, 8 Drawing Sheets

(56) References Cited

U.S. PATENT DOCUMENTS

2016/0259967 A1* 9/2016 Kawashimo ............ G09F 27/00
2016/0275338 A1* 9/2016 Makino .............. G06K 9/00281
2016/0277701 A1* 9/2016 Toyama ............. G06K 9/00255

* cited by examiner

| Image | Trait |
|---|---|
| Image 1A | 50 Years Old |
| Image 2A | 12 Years Old |
| Image 3A | 6 Years Old |
| Image 4A | 45 Years Old |
| Image 1B | 70 Years Old |
| Image 2B | 45 Years Old |
| Image 1C | 40 Years Old |
| Image 2C | 4 Years Old |
| Image 3C | 18 Years Old |

FIG. 4

| Trait | Horizontal Width Reduction Ratio |
|---|---|
| Child 0-5 Years Old | 0 |
| Youth 6-15 Years Old | 5 |
| Adolescent 16-20 Years Old | 10 |
| Adult 21-60 Years Old | 15 |
| Senior 61- Years Old | 10 |

DISPLAY SYSTEM, DISPLAY DEVICE, PROJECTION DEVICE AND PROGRAM

BACKGROUND OF THE INVENTION

Technical Field

The present invention relates to a display system, display device, projection device and program.

Background Art

Conventionally, an image output device mounting apparatus is known to have: an image output device that connects to an image supplying device; a reflective member; and a screen. Output light that contains content and is outputted from the image output device is reflected by the reflective member, and the output light reflected from the reflective member is projected onto a screen formed in the shape of the content, thereby allowing for a heightened impression elicited by the viewer (see Patent Document 1, for example).

RELATED ART DOCUMENT

Patent Document

Patent Document 1: Japanese Patent Application Laid-Open Publication No. 2011-150221.

SUMMARY OF THE INVENTION

With the image output device mounting apparatus described in Patent Document 1, however, the shape of the screen, which is the display unit, is formed into the shape of an object to be displayed in advance, and merely displays this object as-is on the screen during display. Therefore, in a situation such as several objects being interchangeably displayed on a single screen, the above configuration is not capable of performing a display that is suitable to the traits of the object to be displayed.

An aim of the present invention is to make it possible to perform a display that is suitable to the traits of the object to be displayed.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a display system, including: a display unit that displays an image of an object to be displayed; and a control unit configured to: recognize a trait of the object to be displayed from the image of the object to be displayed; determine a display area for the object to be displayed on the display unit in accordance with the recognized trait; modify the image of the object to be displayed such that said object to be displayed is displayed in accordance with the determined display area; and cause the display unit to display the modified image of the object to be displayed on the determined display area of the display unit.

In one aspect, the present disclosure provides a display device, including: a receiving unit that receives an image of an object to be displayed and a trait associated therewith; and a control unit configured to: determine a display area of the object to be displayed on a display unit for displaying the image of the object to be displayed, said display area being determined in accordance with the received image of the object to be displayed and the trait associated therewith; modify the image of the object to be displayed such that said object of the image to be displayed is displayed in accordance with the determined display area; and cause the display unit to display the modified image of the object to be displayed on the determined display area of the display unit.

In one aspect, the present disclosure provides an imaging device, including: an imaging unit that captures an object to be displayed on a display device; a control unit configured to: recognize a trait of the object to be displayed from the image of the object to be displayed obtained by the imaging unit; determine a display area of the object to be displayed on the display device in accordance with the recognized trait; modify the image of the object to be displayed such that said object to be displayed is displayed in accordance with the determined display area; and a transmitting unit that transmits the modified image of the object to be displayed to the display device.

In one aspect, the present disclosure provides a non-transitory storage medium that stores instructions executable by a processor in a computer, said instructions causing the computer to perform the following: receiving an image of an object to be displayed and a trait associated therewith; determining a display area of the object to be displayed on a display unit for displaying the image of the object to be displayed, said display area being determined in accordance with the received trait associated therewith; modifying the image of the object to be displayed such that said object to be displayed is displayed in accordance with the determined display area; and causing the modified image of the object to be displayed to be transmitted to a display device having the display unit.

In one aspect, the present disclosure provides a non-transitory storage medium that stores instructions executable by a processor in an imaging device that photographs an object to be displayed on a display device, said instructions causing the imaging device to perform the following: recognizing a trait of the object to be displayed from an image of the object to be displayed; determining a display area of the object to be displayed on a display unit for displaying the image of the object to be displayed, said display area being determined in accordance with the received trait associated therewith; modifying the image of the object to be displayed such that said object to be displayed is displayed in accordance with the display area; and causing the modified image of the object to be displayed to be transmitted the display device having the display unit.

According to the present invention, it is possible to perform a display that is suitable to the traits of the object to be displayed.

It is to be understood that both the foregoing general description and the following detailed description are exemplary and explanatory, and are intended to provide further explanation of the invention as claimed.

DETAILED DESCRIPTION OF EMBODIMENTS

Preferable embodiments of respective aspects of the present invention will be described in detail below with reference to the attached drawings. The present invention is not limited to the examples shown in the drawings.

Embodiment 1

Configuration of Display System 100

Figure 1:
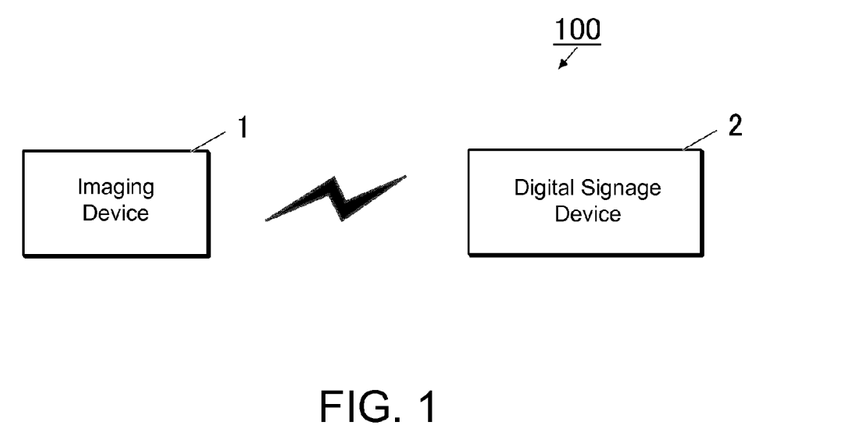
FIG. 1 is a view of the entire configuration of a display system in the present embodiment.

FIG. 1 is a block view of a schematic configuration of a display system 100 in Embodiment 1. The display system 100 is constituted of an imaging device 1 and a digital signage device 2, which can be connected to communicate with each other by a wired or wireless connection.

<Configuration of Imaging Device 1>

Figure 2:
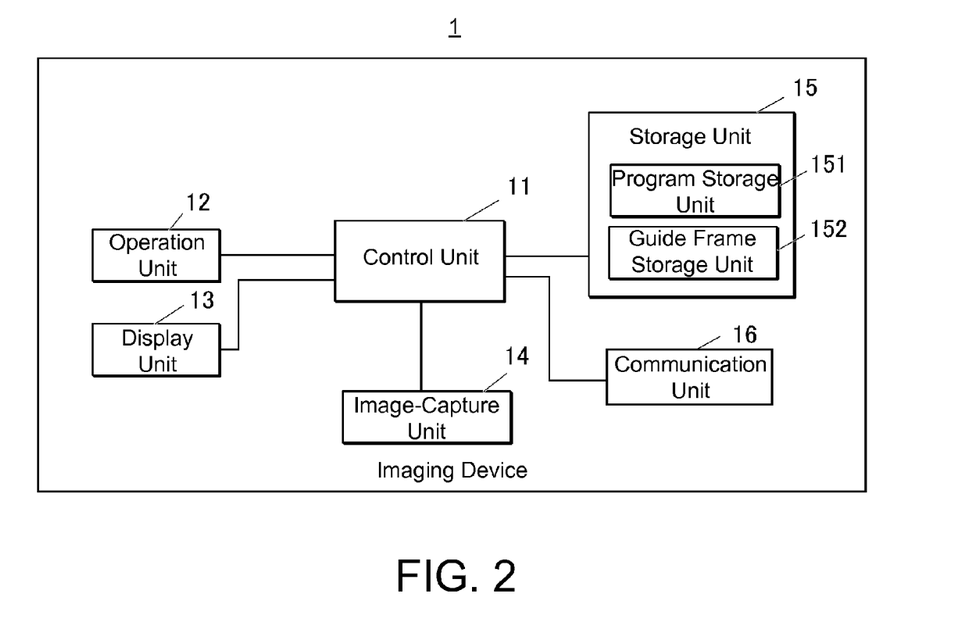
FIG. 2 is a block view of the functional configuration of an imaging device in FIG. 1.

FIG. 2 is a block view of a primary control configuration of the imaging device 1.

As shown in FIG. 2, the imaging device 1 includes a control unit 11, an operation unit 12, a display unit 13, an image-capture unit 14, a storage unit 15, a communication unit 16, and the like. As shown in FIG. 2, the operation unit 12, the display unit 13, the image-capture unit 14, the storage unit 15, and the communication unit 16 are connected to the control unit 11.

The control unit 11 has a CPU (central processing unit) that runs various types of programs stored in the storage unit 15 for controlling prescribed computations and units, and a memory that serves as the work area when the programs are being run (neither is shown). The control unit 11 functions as a recognizing unit through cooperation with programs stored in a program storage unit 151 of the storage unit 15.

The operation unit 12 is constituted of a power source, shutter key, various types of function keys, various types of mode keys, and the like, and outputs operational signals corresponding to respective operation of the keys to the control unit 11. A content imaging mode key that instructs a transition into content imaging mode, during which the content imaging process is executed, described later, is included in the various types of mode keys.

The display unit 13 is constituted of a display panel such as a liquid crystal display panel or an EL display panel and displays various types of screens such as live-view screens for displaying operating screens and images that are being photographed. The display unit 13 displays these screens in accordance with instructions from the control unit 11.

The image-capture unit 14 is an imaging device constituted of an optical lens unit, an image sensor or the like such as a CCD (charge coupled device) or CMOS (complementary metal-oxide semiconductor), an A/D converter circuit substrate, and the like. The image-capture unit converts optical images that have passed through the optical system into two-dimensional image signals in order to obtain image data from a photographic image.

The storage unit 15 is constituted of an HDD (hard drive disk), non-volatile semiconductor memory, or the like. As shown in FIG. 2, the storage unit 15 has the program storage unit 151 and a guide frame storage unit 152.

The program storage unit 151 stores various types of programs executed by the control unit 11 and the necessary data and the like for executing these programs.

Figure 6:
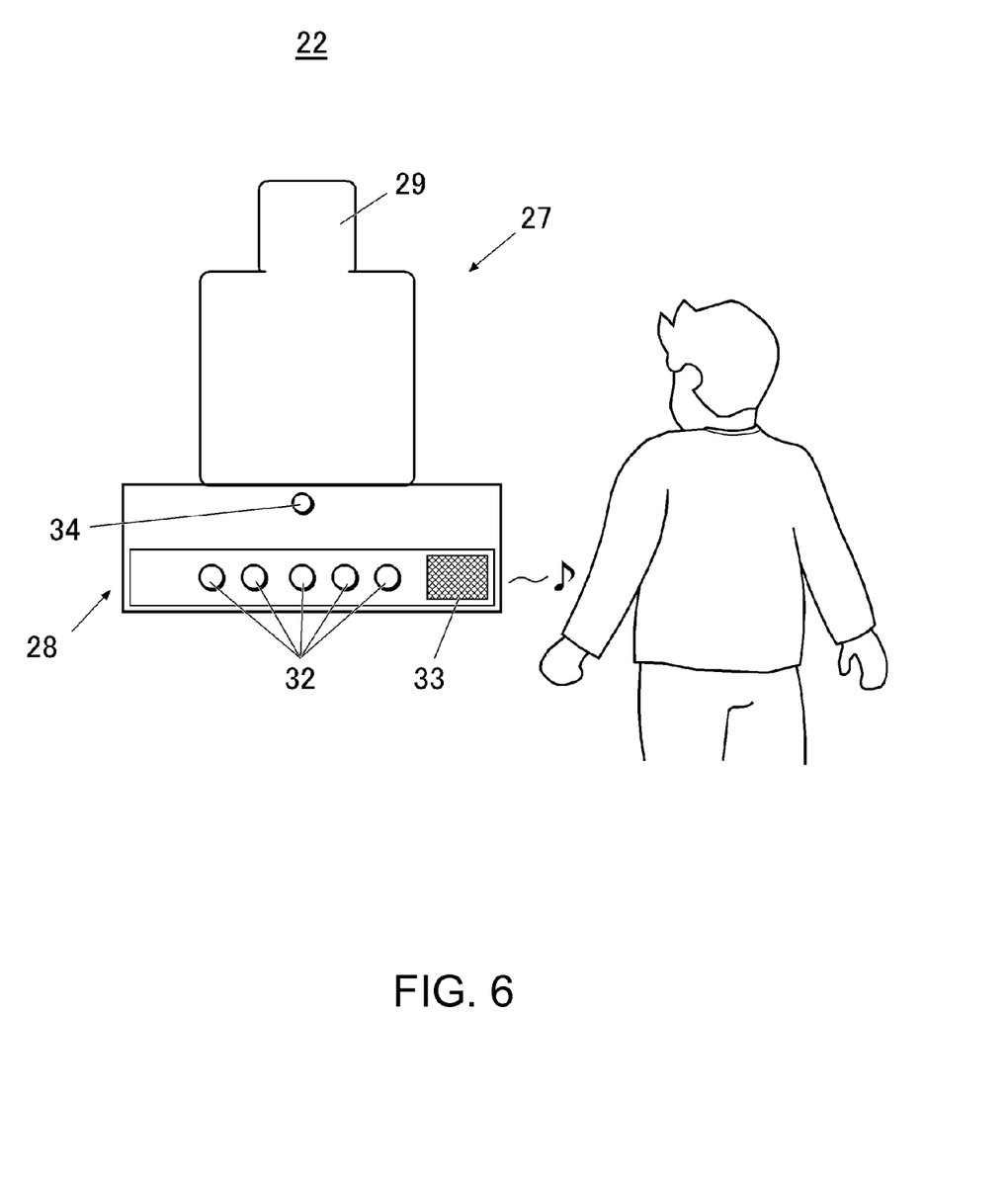
FIG. 6 is a view of the schematic configuration of the screen unit in FIG. 3.

The guide frame storage unit 152 stores a guide frame or the like that shows an area corresponding to a maximum display area of an image display unit 27 (see FIG. 6). This guide frame or the like is used when taking a picture of a human being that is the object to be displayed with the digital signage device 2. The maximum display area of the image display unit 27 is the entire screen area thereof, but the maximum display area may have a prescribed value a of blank space with respect to the screen area.

The communication unit 16 communicates and connects with the digital signage device 2 to send and receive data. The connection with the digital signage device 2 may be a wireless connection using LAN (local area network), Bluetooth (registered trademark), or the like, for example, or may be a wired connection using a USB (universal serial bus) cable or the like, for example; however, there are no particular limitations to the communication scheme.

The communication unit 16 functions as a transmitting unit.

<Configuration of Digital Signage Device 2>

Figure 3:
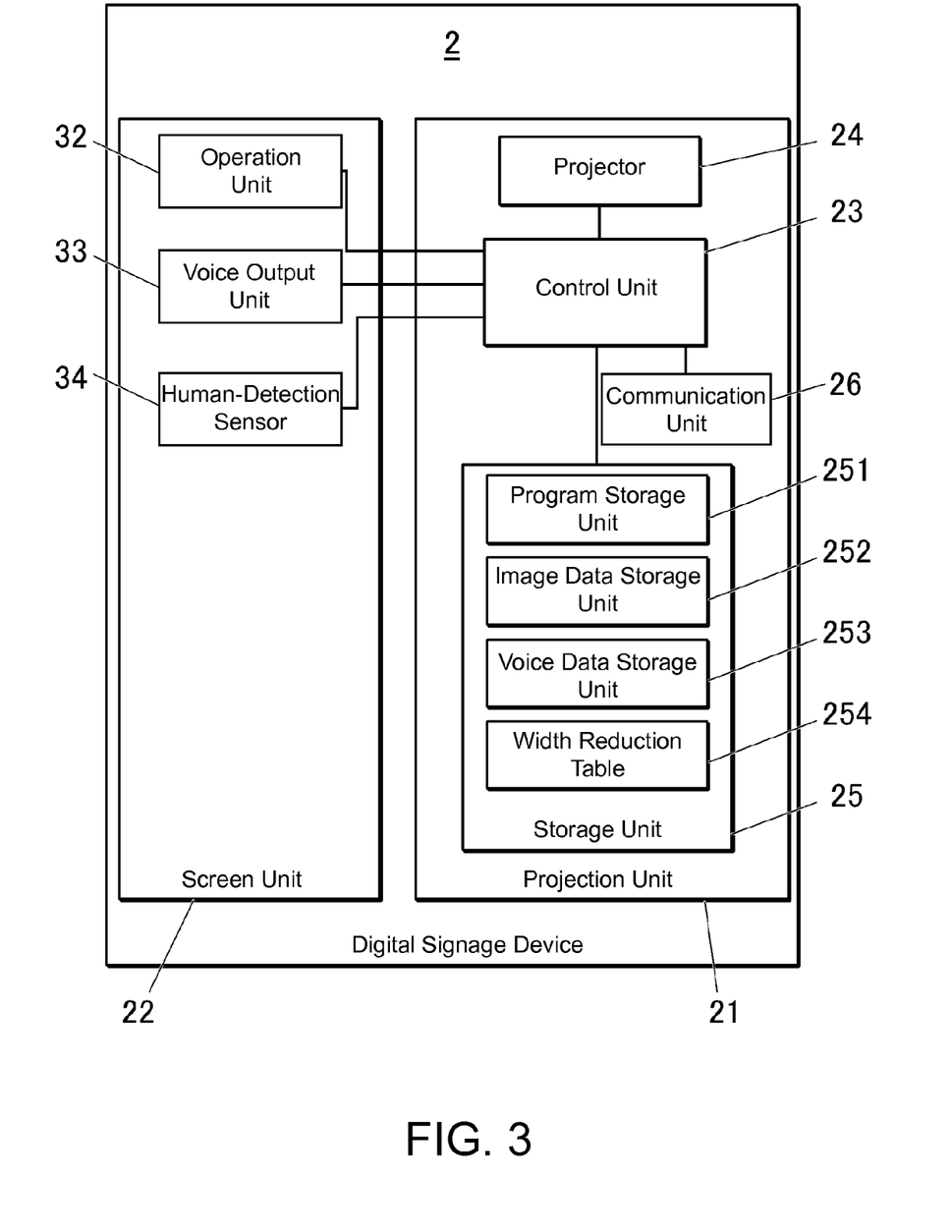
FIG. 3 is a block view of the functional configuration of a digital signage device in FIG. 1.

FIG. 3 is a block view of the primary control configuration of the digital signage device 2, which is a display device of the present embodiment. The digital signage device 2 is a device that reproduces content. The digital signage device 2 may be placed in a store, exhibition venue, or the like, and reproduce content such as product descriptions, guidance, or surveys, or be placed in a care facility or the like and reproduce quiz content for mental fitness, for example. The uses of the digital signage device 2 have no particular limitations. In the present embodiment, "content" means a human being performing some type of explanation or guidance, but is not limited to these.

As shown in FIG. 3, the digital signage device 2 includes a projection unit 21 that emits image light of the content, and a screen unit 22 that receives the image light emitted from the projection unit 21 from behind and projects this light forward.

First, the projection unit 21 will be explained.

The projection unit 21 includes the control unit 23, a projector 24, a storage unit 25, and a communication unit 26. The projector 24, the storage unit 25, and the communication unit 26 are connected to the control unit 23, as shown in FIG. 1.

The control unit 23 has a CPU that runs various types of programs stored in the storage unit 25 for controlling prescribed computations and units, and a memory that serves as the work area when the programs are being run (neither is shown). The control unit 23 functions as a determining unit, a modifying unit, and a display control unit through cooperation with programs stored in a program storage unit 251 of the storage unit 25.

The projector 24 is a projection device that converts image data outputted from the control unit 23 into image light and uses this light to illuminate the image display unit 27 (see FIG. 6) of the screen unit 22. The projector 24 can be a DLP (digital light processing) (registered trademark) projector that uses a DMD (digital micromirror device), which is a display device that has a plurality (if XGA, 1024 pixels×768 pixels) of micromirrors each tilted at different angles and that turns ON/OFF at rapid speed to form optical images from reflected light, for example. When the image of the object to be displayed is a human being in an image, as in the present embodiment, then the micromirrors in a position corresponding to the human being area turn ON, and the other regions turn OFF, thereby making it possible to only project (display) the human being.

The storage unit 25 is constituted of an HDD, non-volatile semiconductor memory, or the like. As shown in FIG. 3, the storage unit 25 has a program storage unit 251, an image data storage unit 252, a voice data storage unit 253, a width reduction table 254, and the like.

The program storage unit 251 stores system programs and various types of processing programs executed by the control unit 23, and the necessary data and the like for executing these programs.

Figure 4:
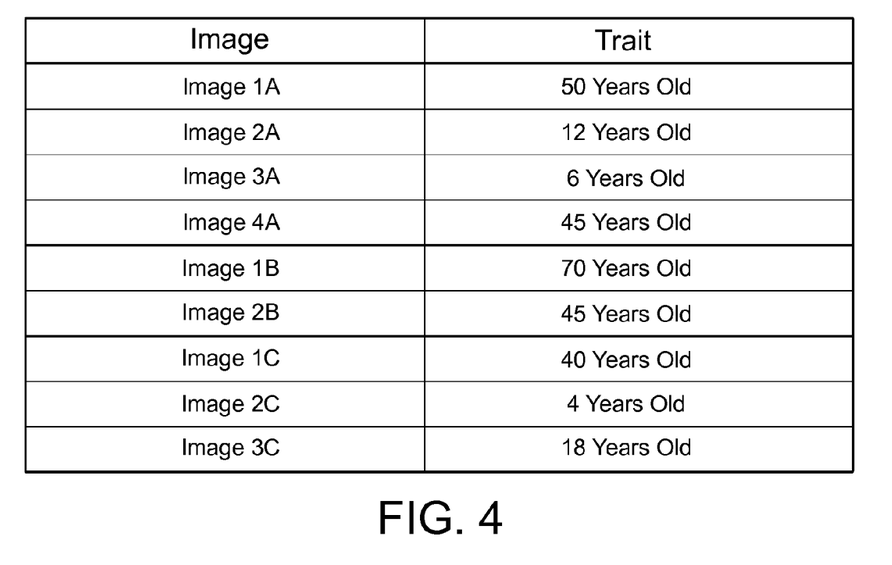
FIG. 4 is a view of a data storage example of an image data storage unit.

As shown in FIG. 4, the image data storage unit 252 respectively stores image data of human beings (images of human beings) that are the object to be displayed during content reproduction, and information indicating traits of the human being in the image (age, in this example). These images of human beings are photographic images taken by the imaging device 1. In the present embodiment, one trait of the human beings is described as age, but this may be a different trait such as gender, body shape, and the like, and is not limited to these.

The voice data storage unit 253 stores text data used for voice output of content.

Figure 5:
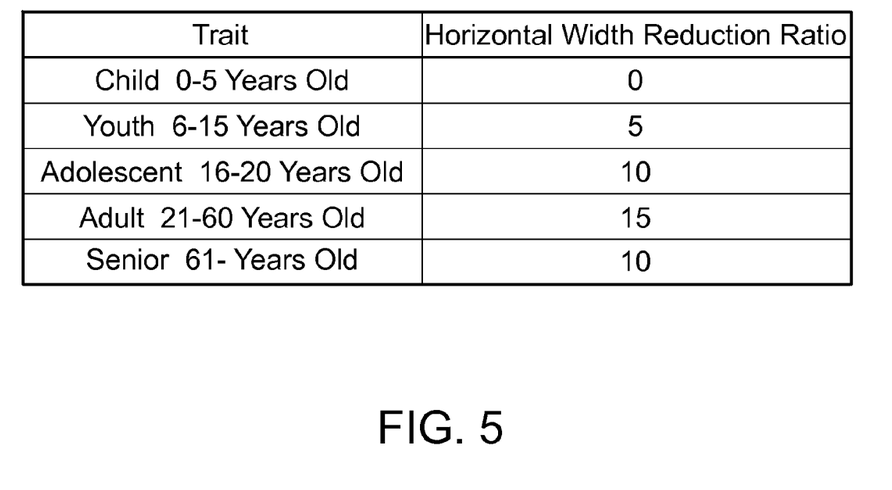
FIG. 5 is a view of a data storage example of a width reduction table.

As shown in FIG. 5, the width reduction table 254 stores human traits and width reduction ratios (reduction ratios for the horizontal width of the largest possible display area of the image display unit) for the display area when human beings having the corresponding traits are displayed on the image display unit 27.

The communication unit 26 communicates and connects with the imaging device 1 and sends and receives data. The connection with the imaging device 1 can be a wireless connection using wireless LAN, Bluetooth, or the like, for example, or a wired connecting using a USB cable or the like, for example; however, the communication scheme has no particular limitations. The communication unit 26 functions as a reception unit.

Next, the screen unit 22 will be explained.

FIG. 6 is a front view of a schematic configuration of the screen unit 22. As shown in FIG. 6, the screen unit 22 includes the image display unit 27, and a base 28 that supports the image display unit 27.

The image display unit 27 is a screen in which film screens for rear projection have been stacked onto a single transmissive plate 29, such as an acrylic plate, formed in a human shape. This transmissive plate 29 is disposed so as to be substantially orthogonal to the illumination direction of image light. A display unit is formed by this image display section 27 and the projector 24 described above.

A button-operated operation unit 32, a voice output unit 33 such as a speaker that outputs a voice, a human-detection sensor 34 and the like are disposed on the base 28.

As shown in FIG. 1, the operation unit 32, the voice output unit 33, and the human-detection sensor 34 are connected to the control unit 23.

<Operation of Display System 100>

Next, the operation of the display system according to Embodiment 1 will be explained.

First, the operation of the imaging device 1 will be explained.

Figure 7:
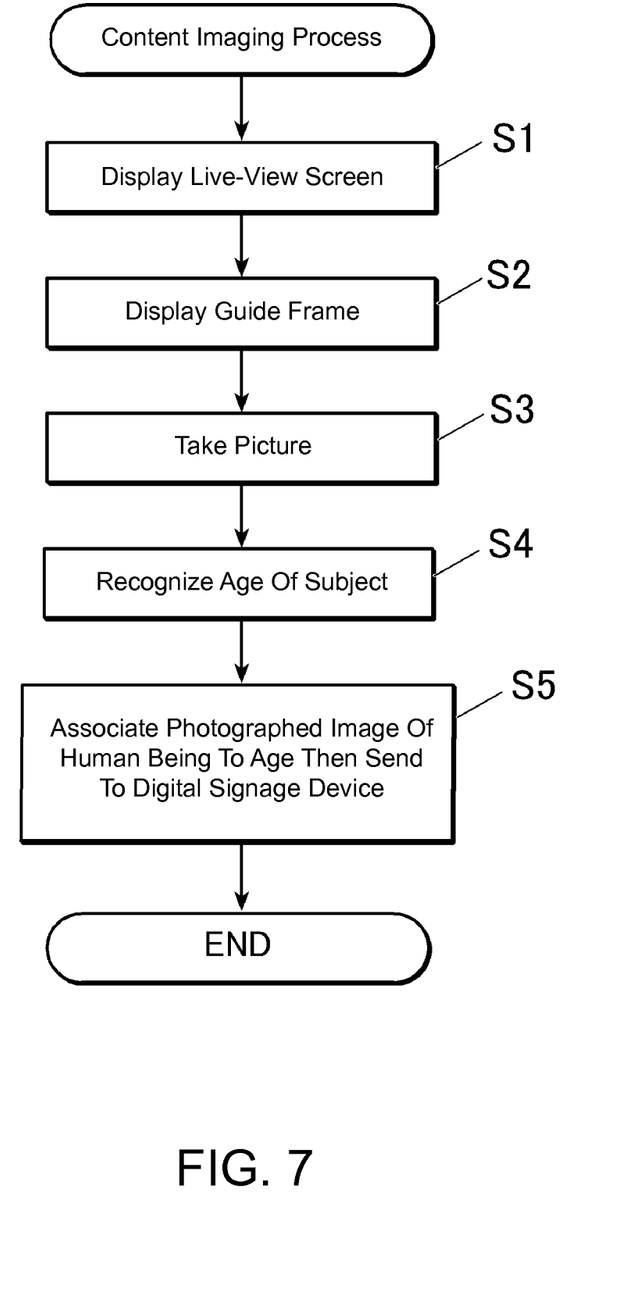
FIG. 7 is a flow chart of a content imaging process executed by the control unit in FIG. 2.

FIG. 7 shows a flow chart of a content imaging process executed by the imaging device 1. The content imaging process captures an image of a human being that will be the object to be displayed during content reproduction in the digital signage device 2. When the content imaging mode key of the operation unit 12 is pressed, the content imaging process is executed in cooperation with the control unit 11 and the programs stored in the program storage unit 151.

The control unit 11 first initializes the capturing of the image by the imaging device 11, and then causes the display unit 13 to display a live-view screen to confirm the captured image in real time (step S1).

Next, the control unit 11 reads the guide frame data from the guide frame storage unit 152 of the storage unit 15 and causes the display unit 13 to display this on the live-view screen (step S2).

By taking a picture of the subject human being in accordance with the displayed guide frame, it is possible to fit the projection image of the human being onto the largest possible display area of the image display unit 27 when the images of human beings obtained by this photographing are projected onto the digital signage device 2.

Next, the control unit 11 performs imaging in accordance with operation of the operation unit 12 (step S3). In other words, pressing the shutter key of the operation unit 12 causes the image data of the images of the human beings captured by the imaging unit 14 to be stored in the photographic image storage area and displayed on the display unit 13.

Next, the control unit 11 recognizes the age of the subject from the images of the human beings obtained through the photographing (step S4). The age of the subject can be recognized by performing facial recognition on the obtained images of the human beings by using well-known age estimation technology in accordance with the traits of the recognized face, for example. A technique in which a human body region of the subject is detected from an image of a human being and then recognized in accordance with the size of the human body, the proportion of the head to the entire body, the size of the head and the shoulders, or the like may be used, as described in Japanese Patent Application Laid-Open Publication No. 2013-218393, for example, Next, the control unit 11 correlates information (in this example, age) indicating the human trait recognized in step S4 to the image data of the human being obtained by photography, and this information is transmitted to the digital signage device 2 by the communication unit (step S5), after which the control unit 11 ends the content imaging process.

Next, the operation of the digital signage device 2 will be explained.

In the digital signage device 2, when the image data and the age information of the image of the human being transmitted from the imaging device 1 are received by the communication unit 26, the control unit 23 correlates the received image data and age in the image of the human being to each other and causes these to be stored in the image data storage unit 252 through cooperation with the programs stored in the program storage unit 251.

When a human being is detected by the human-detection sensor 34, the control unit 23 executes the reproduction control process and performs content reproduction.

Figure 8:
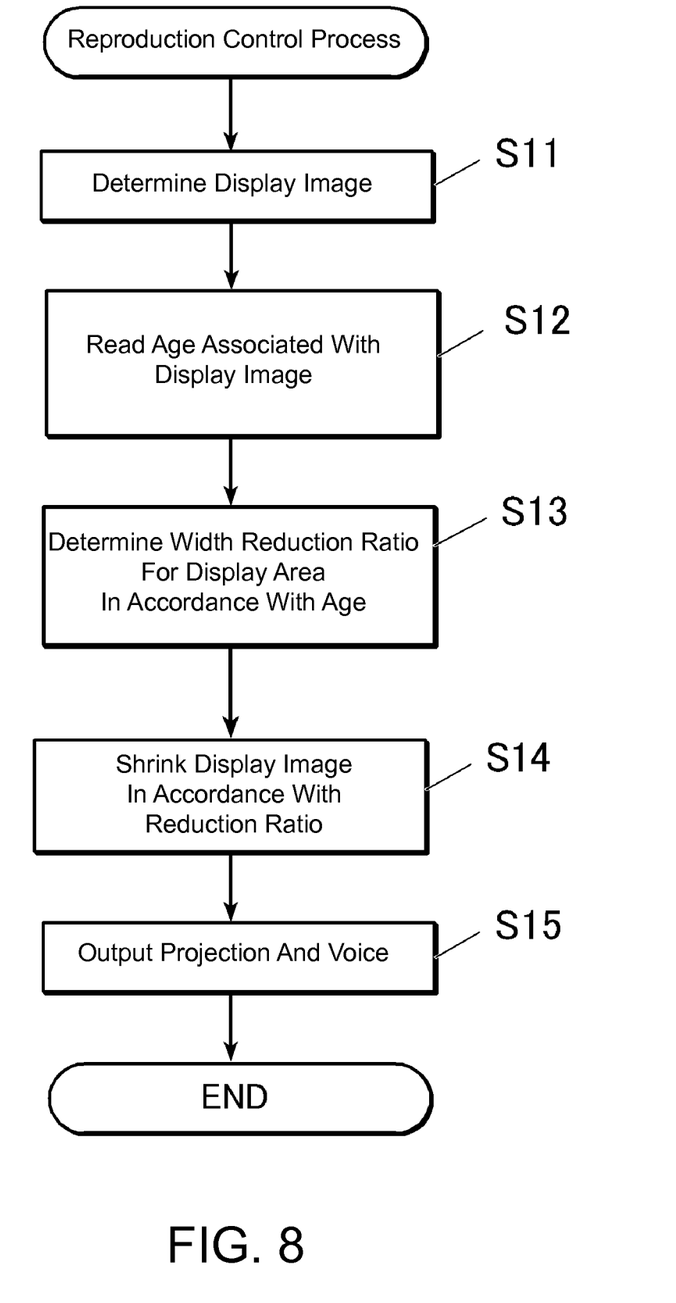
FIG. 8 is a flow chart of a reproduction control process executed by the control unit in FIG. 3.

FIG. 8 is a flowchart of the reproduction control process that is run in the digital signage device 2. The reproduction control process is executed by the control unit 23 and through cooperation with the programs stored in the program storage unit 251 when a human being has been detected by the human-detection sensor 34.

In the reproduction control process, first, the control unit 23 randomly chooses and reads a display image to be displayed on the image unit 27 from the image of a human being that is the object to be displayed and that is stored in the image data storage unit 252 (step S11).

Next, the control unit 23 reads the age that has been correlated to the determined display image and stored in the image data storage unit 252 (step S12). The control unit 23 then refers to the width reduction table 254 and chooses a width reduction ratio for the display area in the image display unit 27 in accordance with the age that has been read (step S13).

The display area of the image display unit 27 is generally the entire screen area of the image display unit 27, but in the present embodiment, an area that has had the width thereof in the horizontal direction of the display area of the entire screen area (in other words, the largest possible display area) reduced in accordance with the age is determined as the display area for the object to be displayed in order to stress the this age trait of the human being that is the object to be displayed.

Figure 9:
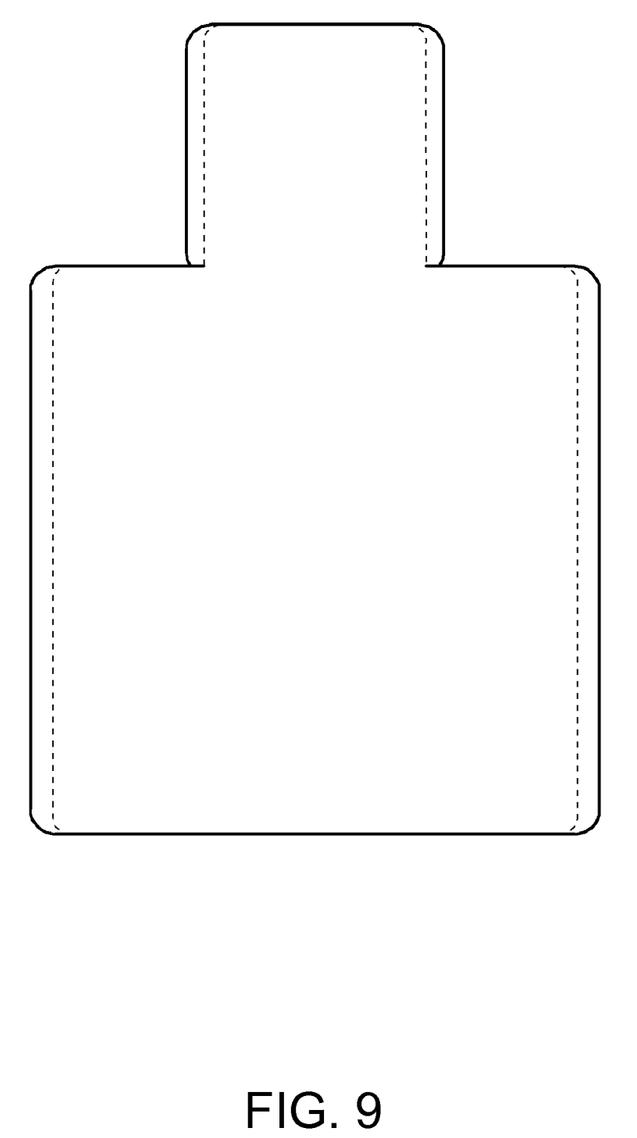
FIG. 9 is a view of one example of a determined display area.

It is known that the shape of the human body changes with age. The body of a child, for example, is not a miniature form of an adult body, but has a shape in which the head is small but wide and occupies a high ratio to the entire body, with this proportion decreasing along with growth and the head eventually becoming an elongated shape. In the present embodiment, an effective display that elicits a strong impression is performed by stressing traits (an age-relevant body shape) of the human being that is the object to be displayed. Therefore, in step S13, the width reduction ratio of the display area when the human being in the display image is displayed is determined in accordance with the age of the subject human being. Due to this, as shown in FIG. 9, when the age of the object to be displayed is an adult, for example, the display area during actual display will be shrunk in the horizontal direction (the area of the dotted line) with respect to the largest possible display area (bold line).

Next, the control unit 23 shrinks the display image in accordance with the determined reduction ratio (step S14). The display image is photographed with the subject human being placed in accordance to the guide frame, and the human being area in the display image is a size that fits the largest possible display area of the image display unit 27 during projection. The width of the display image is reduced in accordance with the width reduction ratio of the display area determined in step S13 so that the human being area in the display image fits the display area determined in step S13.

Next, the control unit 23 makes the projector 24 perform projection (content display) on the basis of the image of the display image and also makes the voice output section 33 output voice content on the basis of voice text data stored in the voice data storage unit 253 (step S15).

Specifically, the human being area is extracted from the display image using a well-known image processing technique, and the display image and positional information thereof is outputted to the projector 24 to cause the human being, which is the object to be displayed, to be projected onto the image display unit 27. The control section 23 synthesizes a voice on the basis of text data expressing voice content stored in the voice data storage section 253, which is outputted by the voice output section 33. The display image is processed and projected (displayed) onto the image display unit 27 by the projector 24 such that the displayed human being lip-syncs along with the voice on the basis of the text data stored in the voice data storage unit 253. The image processing for the voice synthesis and lip-syncing can be performed using well-known techniques.

When content reproduction has ended, the control unit 23 ends the reproduction control process.

In this manner, according to the digital signage device 2, the display area of the object to be displayed on the image display unit 27 is determined in accordance with the traits of the object to be displayed on the image display unit 27 so as to stress these traits, and the display image is reduced and projected in accordance with the determined display area. Accordingly, an effective display that stresses the traits of the object to be displayed can be performed.

Embodiment 2

Next, Embodiment 2 of the present invention will be described.

In Embodiment 1, an example was described in which the display area is determined in accordance with the traits of the object to be displayed in the digital signage device 2, but in Embodiment 2, the display area is determined by an imaging device 1.

The configuration of a display system 100 in Embodiment 2 is substantially similar to the configuration explained using FIGS. 1-3 in Embodiment 1, but the contents stored in storage units 15 and 25 are different.

In Embodiment 2, a width reduction table 254 is stored in the storage unit 15 of the imaging device 1. A program storage unit 151 also stores programs for various types of processes such as a content imaging process B, described later, executed by a control unit 11 and the necessary data for executing these programs. In Embodiment 1, an image data storage unit 252 stored traits of the subject in correlation with the image of the human being, but in the present embodiment, these traits do not need to correlate with the image of the human being.

The other configurations of the display system 100 are similar to those described in Embodiment 1 and thus an explanation thereof will be omitted.

Next, the operation of Embodiment 2 will be explained.

Figure 10:
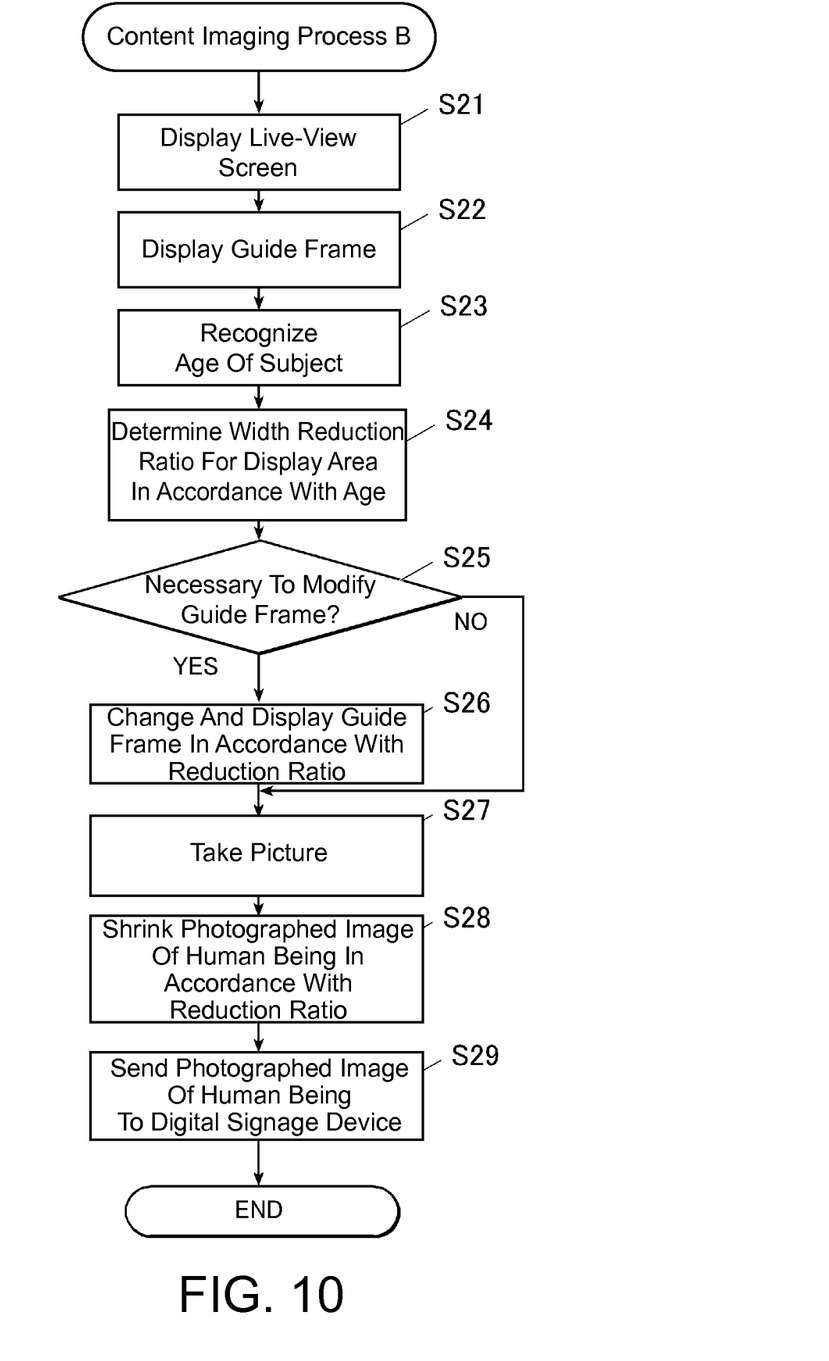
FIG. 10 is a flow chart of a content imaging process B executed by the control unit of FIG. 1 according to Embodiment 2.

FIG. 10 shows a flow chart of the content imaging process B executed by the imaging device 1 in Embodiment 2. The content imaging process B captures an image of a human being that is to be the object to be displayed during content reproduction in the digital signage device 2. When a content imaging mode key of an operation unit 12 is pressed, the content imaging process is executed through cooperation with the control unit 11 and the programs stored in the program storage unit 151 of the storage unit 15. By executing these processes, the control unit 11 functions as a recognizing unit, a determining unit, and a modifying unit.

The control unit 11 first initializes the capturing of the image by an imaging unit 14, and then causes a display unit 13 to display a live-view screen to confirm the captured image in real time (step S21).

Next, the control unit 11 reads guide frame data indicating an image area corresponding to the largest possible display area of an image display unit 27 from a guide frame storage unit 152 of the storage unit 15 and causes the display unit 13 to display this on the live-view screen (step S22).

Next, the control unit 11 recognizes the age of the subject from the image of the human being captured by the imaging unit 14 (step S23). The age recognition of the subject is similar to that described in step S4 in FIG. 7 and thus an explanation thereof will be omitted.

Next, the control unit 11 refers to a width reduction table 254 stored in the storage unit 15 in accordance with the recognized age and determines a width reduction ratio (a horizontal width reduction ratio with respect to the total display area of the image display unit 27) for the display area on the image display unit 27 in accordance with the age (step S24).

The display area on the image display unit 27 is generally the entire screen area of the image display unit 27, but in the present embodiment, in a manner similar to Embodiment 1, an area of the display area on the entire screen area (namely, the largest possible display area) that has been shrunk in either the vertical direction or horizontal direction (horizontal direction, in the present embodiment) is determined as the display area for the human being that is the object to be displayed in order to perform an effective display that elicits a strong impression by stressing traits of the human being (age, in this example), which is the object to be displayed.

Next, the control unit 11 judges whether it is necessary to modify the guide frame on the basis of the determined reduction ratio of the display area (step S25). When the determined reduction ratio is 0%, there is no change to the display area on the image display unit 27; thus, the control unit 11 judges it is not necessary to modify the guide frame. When the determined reduction ratio is not 0%, the display area on the image display unit 27 changes; thus, the control unit 11 judges it is necessary to modify the guide frame.

When it is judged that it is not necessary to modify the guide frame (NO in step S25), the control unit 11 transitions to the process in step S27.

When it is judged that it is necessary to modify the guide frame (YES in step S25), the control unit 11 modifies the guide frame in accordance with the reduction ratio determined in step S24, causes this to be displayed on the live-view screen of the display unit 13 (step S26), and then transitions to step S27.

In step S26, the control unit 11 displays the first guide frame and the second guide frame, for example. The first guide frame is for when the object is placed, for example, and displays an area of the imaging region corresponding to the largest possible display area on the image display unit 27. The second guide frame displays an image area corresponding to the display area of the imaging area determined in step S24 (in other words, the area of the largest possible display area shrunk in accordance with the reduction ratio determined in step S24). In a later process, the object that has been placed and photographed to fit the first guide frame has the width thereof reduced to fit into the second guide frame; therefore, by displaying the second guide frame, it is possible to provide an image to the photographer that shows how the photographed object will be displayed on the image display unit 27 during projection. The display image in the first guide frame and the second guide frame is similar to the configuration shown in FIG. 9. The solid-line frame in FIG. 9 corresponds to the first guide frame, and the dotted-line frame in FIG. 9 corresponds to the second guide frame.

In step S27, the control unit 11 performs imaging in accordance with operation of the operation unit 12 (step S27). In other words, the control unit 11 causes the image data of an image of a human being captured by the imaging unit 14 to be stored in the photographic image area of the memory in accordance with the pressing of the shutter key of the operation unit 12, and then causes this to be displayed on the display unit 13.

Next, the control unit 11 shrinks the image of the human being stored in the photographic image area in accordance with the determined reduction ratio (step S28). The image of the human being that has been photographed has been captured while the human being is fitted into the guide frame in the imaging device 1, and the human being area in the display image is a size that fits the largest possible display area of the image display unit 27 during projection. The width of the image of the human being that has been photographed is reduced in accordance with the width reduction ratio of the display area determined in step S24 so that the human being area fits the display area that has had the width thereof reduced in accordance with the width reduction ratio determined in step S24.

The control unit 11 ends the content imaging process B after the generated image data of the image of the human being is sent to the digital signage device 2 from the communication unit 16 (step S29).

In the digital signage device 2, if the image data is received from the imaging device 1 by the communication 26, the control unit 23 stores the received image data of the image of the human being in the image data storage unit 252.

When a human being is detected by the human-detection sensor 34, the control unit 23 executes the reproduction control process B. In other words, the display image to be displayed on the image control unit is randomly chosen and read from images of human beings stored in the image data storage unit 252 and then projected (displayed) on the image display unit 27 by the projector 24, and a voice is synthesized in accordance with the text data stored in the voice data storage unit 253 and outputted by the voice output unit 33. The processes in the projection and voice output steps are similar to step S15 in FIG. 8, and thus an explanation thereof will be omitted.

As described above, according to the display system 100 in Embodiment 1, in the imaging device 1, the control unit 11 recognizes human traits from the image of the human being that is the object to be displayed, which has been obtained by photography, and information indicating the recognized traits is correlated with the image and transmitted to the digital signage device 2 from the communication unit 16. In the digital signage device 2, the display area on the image display unit 27 is determined in accordance with this information indicating the human traits that have been correlated to the image of the human being that is the object to be displayed, and the image of the human being that is the object to be displayed is modified so as to be displayed in accordance with the determined display area, after which the modified image is displayed on the determined display area of the image display unit 27.

According to the display system 100 in Embodiment 2, the control unit 11 of the imaging device 1 recognizes a human trait from the image of the human being that is the object to be displayed, which is obtained by photography, and determines a display area on the image display unit 27 in accordance with the recognized trait, and then modifies the image of the human being that is the object to be displayed so as to be displayed in the determined display area, after which the modified image is sent to the digital signage device 2 from the communication unit 16. In the digital signage device 2, the control unit 23 causes the projector 24 to display the image of the human being, which is the object to be displayed on the determined display area of the image display unit 27.

Accordingly, it is possible to perform a display that fits the traits of the object to be displayed.

Specifically, the control unit 11 or the control unit 23, in accordance with the human traits of the object to be displayed, reduces the horizontal width of the prescribed largest possible display area on the image display unit 27 in order to make the display area of the object to be displayed an area of the largest possible display area that has had the vertical and horizontal ratio thereof changed. The control unit 11 or the control unit 23 then shrinks the image of the object to be displayed in accordance with the determined display area. Accordingly, an effective display that stresses the human traits of the object to be displayed is possible.

In Embodiment 2, the imaging device 1 displays a guide frame indicating an area corresponding to the determined display area on the live-view screen; therefore, the photographer can see how the human being that has been photographed will be displayed on the image display unit 27 during projection.

The content in the present embodiment as described above is one preferable example of the digital signage device according to the present invention, and the present invention is not limited to this.

In the respective embodiments above, an example was described in which only the horizontal width reduction ratio of the largest possible display area was varied in accordance with the traits of object to be displayed, but the vertical width may also be variable, for example. When the human being that is the object to be displayed is a child (0-5 years old), the horizontal width reduction ratio may be 0% and the vertical width reduction ratio may be 5%, thereby stressing horizontal width, which is a trait of children as described above.

If the vertical-horizontal ratio is to be changed in order to stress the traits of the human being that is the object to be displayed, then both the vertical direction and the horizontal direction may be shrunk.

The human traits may be stressed by enlarging at least one of the vertical direction and horizontal direction of the display area to change the vertical-horizontal ratio, as long as projected image of the human being does not protrude from the screen area of the image display unit 27 when the display image is projected onto the display area of the image display unit 27. When the human being that is the object to be displayed is a child, for example, the horizontal width that is a trait of children may be stressed by making the enlargement ratio of horizontal width 5%.

In the respective embodiments above, an example was described in which the traits of the human being that is the object to be displayed are stressed, but the traits of the human being that is the object to be displayed may also be reduced by changing the vertical-horizontal ratio of the display area. When the trait in question is body shape, for example, an overweight person (a person having a horizontal to vertical width ratio that is above a prescribed amount with respect to an ideal balance for the human body, for example) can have the traits thereof reduced by reducing the horizontal width of the display area or enlarging the vertical width thereof.

The body shape of a thin person (a person having a horizontal to vertical width ratio that is below a prescribed amount with respect to an ideal balance for the human body, for example) can have the traits thereof reduced by reducing the vertical width of the display area or enlarging the horizontal width thereof.

Short people (a person having a vertical width that is below a prescribed amount with respect to an ideal balance for the human body) can have the traits thereof reduced by enlarging the vertical width of the display area.

Tall people (a person having a vertical width that is above a prescribed amount with respect to an ideal balance for the human body) can have the traits thereof reduced by reducing the vertical width of the display area. In this manner, it is possible to display the human being that is the object to be displayed in a way that is preferable for the person in question or the like.

In the respective embodiments above, the object to be displayed was described as being a human being, but without being limited to this, the object to be displayed may be an animal, character, or the like, for example.

In the respective embodiments described above, an example was described in which the display device of the present invention was applied to a digital signage device, but the present invention is applicable and can exhibit similar effects even if applied to a liquid crystal display, a plasma display, or other display devices, for example, and is not limited to these examples.

Other detailed configurations and detailed operations of the respective devices constituting the digital signage device can also be appropriately modified without departing from the spirit of the invention.

Several embodiments of the present invention were described, but the scope of the present invention is not limited to these, and includes the scope of the invention as described in the claims and the equivalents thereto.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A display system, comprising:
   a display unit that includes a screen having generally a human outline shape, the display unit displaying, on the screen, an image of an object to be displayed that has generally a human shape; and
   a control unit configured to:
   recognize a trait of the object to be displayed from the image of the object to be displayed;
   determine a display area within the screen of the display unit on which the image of the object is to be displayed in accordance with the recognized trait, said display area being smaller than an entire area of the screen;
   modify the image of the object to be displayed such that the modified image of said object to be displayed is substantially fitted to the determined display area in shape and size; and
   cause the display unit to display the modified image of the object to be displayed on the determined display area on the screen of the display unit.

2. The display system according to claim 1,
   wherein, in determining the display area within the screen, in accordance with the recognized trait, the control unit shrinks or enlarges at least one of a vertical dimension and a horizontal dimension of an area corresponding to the screen of the display unit, thereby determining the display area that has a vertical-horizontal ratio thereof modified relative to the generally human outline shape of the screen, and
   wherein in modifying the image of the object to be displayed, the control unit shrinks or enlarges the image of the object to be displayed in accordance with the determined display area.

3. The display system according to claim 1, wherein the control unit determines the display area of the object to be displayed on the screen of the display unit such that the recognized trait associated therewith is stressed or reduced.

4. The display system according to claim 2, wherein the control unit determines the display area of the object to be displayed on the screen of the display unit such that the recognized trait associated therewith is stressed or reduced.

5. The display system according to claim 1, further comprising:
an imaging device; and
a display device that is connectable to the imaging device, wherein the imaging device comprises:
an imaging unit that photographs the image of the object to be displayed;
a first control unit configured to recognize the trait of the object to be displayed from the image of the object to be displayed, said first control unit thereby constituting a part of the control unit; and
a transmitting unit that transmits, to the display device, the image of the object to be displayed that has been obtained by the imaging unit and the recognized trait associated therewith, and
wherein the display device comprises:
a receiving unit that receives the image of the object to be displayed and said trait associated therewith transmitted by the imaging device;
said display unit; and
a second control unit configured to determine the display area within the screen of the display unit on which the image of the object is to be displayed in accordance with said trait associated therewith, modify the image of the object to be displayed such that the modified image of said object to be displayed is substantially fitted to the display area in shape and size, and cause the display unit to display the modified image of the object to be displayed on the display area on the screen of the display unit, said second control unit thereby constituting a part of said control unit.

6. The display system according to claim 2, further comprising:
an imaging device; and
a display device that is connectable to the imaging device, wherein the imaging device comprises:
an imaging unit that photographs the image of the object to be displayed;
a first control unit configured to recognize the trait of the object to be displayed from the image of the object to be displayed, said first control unit thereby constituting a part of the control unit; and
a transmitting unit that transmits, to the display device, the image of the object to be displayed that has been obtained by the imaging unit and the recognized trait associated therewith, and
wherein the display device comprises:
a receiving unit that receives the image of the object to be displayed and said trait associated therewith transmitted by the imaging device;
said display unit; and
a second control unit configured to determine the display area within the screen of the display unit on which the image of the object is to be displayed in accordance with said trait associated therewith, modify the image of the object to be displayed such that the modified image of said object to be displayed is substantially fitted to the display area in shape and size, and cause the display unit to display the modified image of the object to be displayed on the display area on the screen of the display unit, said second control unit thereby constituting a part of said control unit.

7. The display system according to claim 3, further comprising:
an imaging device; and
a display device that is connectable to the imaging device, wherein the imaging device comprises:
an imaging unit that photographs the image of the object to be displayed;
a first control unit configured to recognize the trait of the object to be displayed from the image of the object to be displayed, said first control unit thereby constituting a part of the control unit; and
a transmitting unit that transmits, to the display device, the image of the object to be displayed that has been obtained by the imaging unit and the recognized trait associated therewith, and
wherein the display device comprises:
a receiving unit that receives the image of the object to be displayed and said trait associated therewith transmitted by the imaging device;
said display unit; and
a second control unit configured to determine the display area within the screen of the display unit on which the image of the object is to be displayed in accordance with said trait associated therewith, modify the image of the object to be displayed such that the modified image of said object to be displayed is substantially fitted to the display area in shape and size, and cause the display unit to display the modified image of the object to be displayed on the display area on the screen of the display unit, said second control unit thereby constituting a part of said control unit.

8. The display system according to claim 4, further comprising:
an imaging device; and
a display device that is connectable to the imaging device, wherein the imaging device comprises:
an imaging unit that photographs the image of the object to be displayed;
a first control unit configured to recognize the trait of the object to be displayed from the image of the object to be displayed, said first control unit thereby constituting a part of the control unit; and
a transmitting unit that transmits, to the display device, the image of the object to be displayed that has been obtained by the imaging unit and the recognized trait associated therewith, and
wherein the display device comprises:
a receiving unit that receives the image of the object to be displayed and said trait associated therewith transmitted by the imaging device;
said display unit; and
a second control unit configured to determine the display area within the screen of the display unit on which the image of the object is to be displayed in accordance with said trait associated therewith, modify the image of the object to be displayed such that the modified image of said object to be displayed is substantially fitted to the display area in shape and size, and cause the display unit to display the modified image of the object to be displayed on the display area on the screen of the display unit, said second control unit thereby constituting a part of said control unit.

9. The display system according to claim 1, further comprising:
an imaging device; and
a display device that is connectable to the imaging device, wherein the imaging device comprises:
an imaging unit that photographs the image of the object to be displayed;
a first control unit configured to recognize the trait of the object to be displayed from the image of the object to be displayed, determine a display area within the screen of the display unit on which the image of the object is to be displayed in accordance with the trait associated therewith, and modify the image of the object to be displayed such that the modified image of said object is substantially fitted to the display area in shape and size, said first control unit thereby constituting a part of said control unit; and
a transmitting unit that transmits the image of the object to be displayed that has been modified by the first control unit to the display device, and
wherein the display device comprises:
a receiving unit that receives the modified image of the object to be displayed transmitted by the imaging device and the trait associated therewith;
said display unit; and
a second control unit configured to cause the display unit to display the modified image of the object to be displayed on the display area on the screen of the display unit, said second control unit thereby constituting a part of said control unit.

10. The display system according to claim 9, wherein the imaging device further includes a monitor screen showing an image being captured by the imaging unit, said monitor screen displaying, on the monitor screen, a guide frame that shows an area corresponding to the determined display area relative to the screen of the display unit.

11. A display device, comprising:
a receiving unit that receives an image of an object to be displayed having generally a human shape and a trait associated therewith; and
a control unit configured to:
determine a display area within a screen of a display unit on which the image of the object is to be displayed, said screen of the display unit having generally a human outline shape, said display area being determined in accordance with the received image of the object to be displayed and the trait associated therewith and being smaller than an entire area of the screen;
modify the image of the object to be displayed such that the modified image of said object of the image to be displayed is substantially fitted to the determined display area in shape and size; and
cause the display unit to display the modified image of the object to be displayed on the determined display area on the screen of the display unit.

12. An imaging device, comprising:
an imaging unit that captures an image of an object that is to be displayed on a screen of a display unit of a display device, said object having generally a human shape, said screen having generally a human outline shape;
a control unit configured to:
recognize a trait of the object to be displayed from the image of the object to be displayed obtained by the imaging unit;
determine a display area within the screen of the display unit on which the image of the object is to be displayed in accordance with the recognized trait, said display area being smaller than an entire area of the screen;
modify the image of the object to be displayed such that the modified image of said object to be displayed is substantially fitted to the determined display area in shape and size; and
a transmitting unit that transmits the modified image of the object to be displayed to the display device.

13. A non-transitory storage medium that stores instructions executable by a processor in a computer, said instructions causing the computer to perform the following:
receiving an image of an object to be displayed on a screen of a display unit and a trait associated therewith, said object having generally a human shape, said screen having generally a human outline shape;
determining a display area within the screen of the display unit on which the image of the object is to be displayed, said display area being determined in accordance with the received trait associated therewith and being smaller than an entire area of the screen;
modifying the image of the object to be displayed such that the modified image of said object to be displayed is substantially fitted to the determined display area in shape and size; and
causing the modified image of the object to be displayed to be transmitted to a display device having the display unit.

14. A non-transitory storage medium that stores instructions executable by a processor in an imaging device that photographs an object to be displayed on a screen of a display unit of a display device, said object having generally a human shape, said screen having generally a human outline shape, said instructions causing the imaging device to perform the following:
recognizing a trait of the object to be displayed from an image of the object to be displayed;
determining a display area within the screen of the display unit on which the image of the object is to be displayed, said display area being determined in accordance with the received recognized trait associated therewith and being smaller than an entire area of the screen;
modifying the image of the object to be displayed such that the modified image of said object to be displayed is substantially fitted to the determined display area in shape and size; and
causing the modified image of the object to be displayed to be transmitted to the display device having the display unit.

* * * * *